US012475865B2

(12) United States Patent
Murai

(10) Patent No.: US 12,475,865 B2
(45) Date of Patent: Nov. 18, 2025

(54) HAMMER DEVICE FOR KEYBOARD INSTRUMENT

(71) Applicant: KABUSHIKI KAISHA KAWAI GAKKI SEISAKUSHO, Hamamatsu (JP)

(72) Inventor: Takuma Murai, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 201 days.

(21) Appl. No.: 18/473,062

(22) Filed: Sep. 22, 2023

(65) Prior Publication Data

US 2024/0112651 A1 Apr. 4, 2024

(30) Foreign Application Priority Data

Sep. 30, 2022 (JP) ................................ 2022-157246

(51) Int. Cl.
*G10C 3/18* (2006.01)

(52) U.S. Cl.
CPC .................................... *G10C 3/18* (2013.01)

(58) Field of Classification Search
CPC . G10C 3/18; G10C 3/12; G10H 1/344; G10H 1/346; G10B 1/04
See application file for complete search history.

(56) References Cited

U.S. PATENT DOCUMENTS

| | | | | |
|---|---|---|---|---|
| 8,530,732 B2 * | 9/2013 | Suzuki | G10H 1/346 | 84/243 |
| 2009/0078107 A1 * | 3/2009 | Osuga | G10H 1/346 | 84/423 R |
| 2015/0114202 A1 * | 4/2015 | Suzuki | G10C 3/12 | 84/236 |
| 2018/0277082 A1 * | 9/2018 | Suzuki | G10H 1/346 | |
| 2020/0043446 A1 * | 2/2020 | Akaishi | G10C 3/18 | |
| 2020/0074968 A1 * | 3/2020 | Suzuki | G10H 1/346 | |
| 2020/0126527 A1 * | 4/2020 | Sato | G10H 1/346 | |

FOREIGN PATENT DOCUMENTS

JP 2015-87591 A 5/2015

* cited by examiner

*Primary Examiner* — Erin Kryukova
(74) *Attorney, Agent, or Firm* — Womble Bond Dickinson (US) LLP

(57) ABSTRACT

A hammer device for a keyboard instrument includes a plurality of hammers. Each hammer has a hammer body extending in a front-rear direction and having a front half thereof pivotally supported and a rear half thereof formed with a weight mounting portion. A first weight common in shape and size to the hammers is attached to one of left and right side surfaces of the weight mounting portion. A second weight is attached to the other of the left and right side surfaces of the weight mounting portion. The first weight includes a stopper contact portion which protrudes at least either more upward or more downward than the second weight, and is brought into contact with a stopper in accordance with pivotal movement of the hammer caused by depression of a key associated therewith.

2 Claims, 9 Drawing Sheets

HAMMER DEVICE FOR KEYBOARD INSTRUMENT

CROSS-REFERENCE TO RELATED APPLICATION

This application claims priority to Japanese Patent Application Number 2022-157246, filed on Sep. 30, 2022, the entire content of which is incorporated herein by reference.

BACKGROUND OF THE INVENTION

Field of the Invention

The present invention relates to a hammer device for a keyboard instrument, which is applied to a keyboard instrument, such as an electronic piano, and is configured to add a touch weight to a key by a hammer pivotally moved in interlock with depression of the key.

Description of the Related Art

Conventionally, as this type of a hammer device for a keyboard instrument, there has been known, for example, one disclosed in Japanese Laid-Open Patent Publication (Kokai) No. 2015-87591 already filed by the present applicant. This hammer device includes a hammer body extending in a front-rear direction, and two left and right weights mounted on a rear portion of the hammer body in a state sandwiching the rear portion from the left and the right. A common weight as one of the two weights extends in the front-rear direction and is formed to have a shape and a size which are common to all hammers of the keyboard instrument. Further, an adjustment weight as the other of the two weights extends in the front-rear direction and is formed to have a length dimension in the front-rear direction which is not larger than a length dimension in the front-rear direction of the common weight and is set according to a touch weight required for a key associated with the hammer.

The above-described hammer device uses the common weight and the adjustment weight. The common weight and the adjustment weight are formed such that the lengths of the two weights in the front-rear direction are equal to each other or the length of the adjustment weight is shorter than that of the common weight, but such that the heights of the two weights in a vertical direction are formed equal to each other. In general, the key stroke of a key being depressed is determined according to the angle of pivotal movement of an associated hammer which is pivotally moved in interlock with depression of the key until the hammer is brought into contact with a stopper, and hence in a keyboard device to which the above-described hammer device is applied, all the key strokes are equal to each other, which sometimes makes it difficult to adjust the key stroke or the touch weight on a key-by-key basis.

Further, in the above-described hammer device, when a hammer is pivotally moved in accordance with depression of a key associated therewith, the two weights, i.e., the common weight and the adjustment weight of the hammer are sometimes brought into contact with stoppers, such as cushions. In this case, noise is sometimes generated since the contact areas of the weights with the stoppers are relatively large.

SUMMARY OF THE INVENTION

It is an object of the present invention to provide a hammer device for a keyboard instrument, which enables a key stroke and a touch weight at the time of key depression to be adjusted with ease and makes it possible to suppress generation of noise when a hammer is brough into contact with a stopper.

To attain the above object, the present provides a hammer device for a keyboard instrument, which includes a plurality of hammers each provided in association with an associated one of a plurality of keys, and in which each of the hammers is pivotally moved in interlock with depression of the associated key to thereby add a touch weight to the key, wherein each of the plurality of hammers includes a hammer body extending in a front-rear direction, the hammer body having a front half thereof pivotally supported and a rear half thereof formed with a weight mounting portion, a first weight extending in the front-rear direction, the first weight being formed common in shape and size to the plurality of hammers, and attached to one of left and right side surfaces of the weight mounting portion, and a second weight extending in the front-rear direction and attached to the other of the left and right side surfaces of the weight mounting portion, wherein the first weight includes a stopper contact portion protruding at least either more upward or more downward than the second weight, for being brought into contact with a stopper in accordance with pivotal movement of the hammer caused by depression of the key associated therewith.

According to this construction, each of the plurality of hammers has the hammer body and the first and second weights all of which extend in the front-rear direction, and for the hammer body which has the front half thereof pivotally supported, the first and second weights are attached to the respective left and right side surfaces of the weight mounting portion formed on the rear half of the hammer body. Further, the first weights of the respective hammers are formed identical in shape and size to each other. By attaching the above-described first and second weights to the hammer body of each hammer, e.g. in a case where a length dimension of the second weight in the front-rear direction is set to be equal to or shorter than that of the first weight, it is possible to secure not less than half of weight required for the hammer using the first weight and easily adjust the weight required for the hammer using the second weight.

Further, the first weight is provided with the stopper contact portion protruding at least either more upward or more downward than the second weight. Out of the hammer pivotally moved in interlock with depression of the key, the stopper contact portion of the first weight is brought into contact with the stopper. With this, compared with e.g. a case where both of the first and second weights are brought into contact with the stopper, it is possible to reduce an area brought into contact with the stopper, whereby it is possible to suppress generation of noise when the hammer is brought into contact with the stopper. Further, by adjusting the height of the stopper contact portion, it is possible to change timing at which the hammer is brought into contact with the stopper, whereby it is possible to adjust a key stroke of the key.

Preferably, the second weight has a length dimension in the front-rear direction set according to a touch weight required for the associated key.

According to the construction of this preferred embodiment, since the weight of the second weight can be changed by changing the length dimension of the second weight in the front-rear direction, it is possible to easily adjust a touch weight required for the associated key using the total weight of the first and second weights.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A and 8B are views of a first arm, in which FIG. 8A is a perspective view of the appearance of the first arm and FIG. 8B is an exploded perspective view of the first arm in a state in which an arm body and two weights are separated from each other;

DETAILED DESCRIPTION OF PREFERRED EMBODIMENTS

Figure 1A:
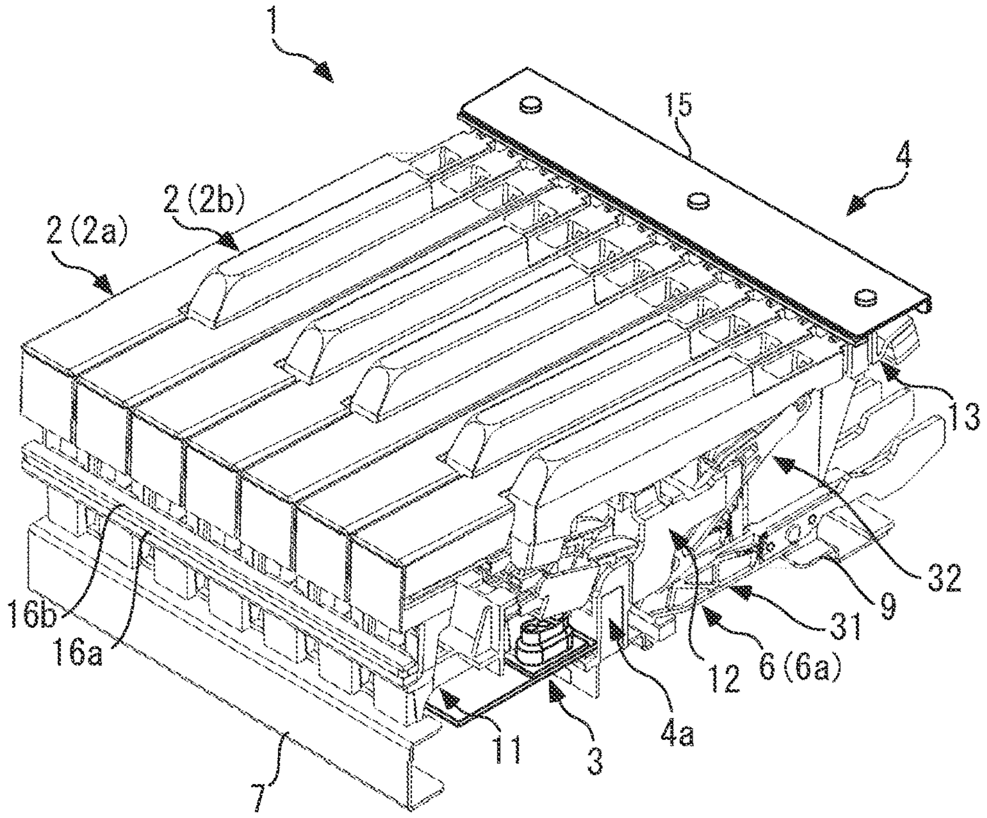

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
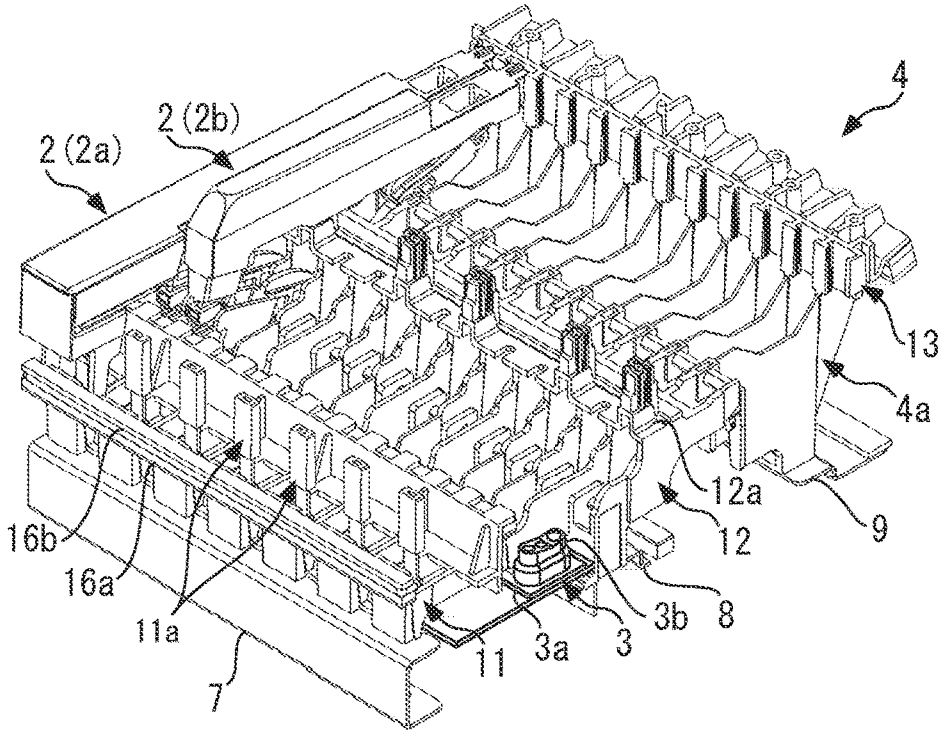
Figure 2:
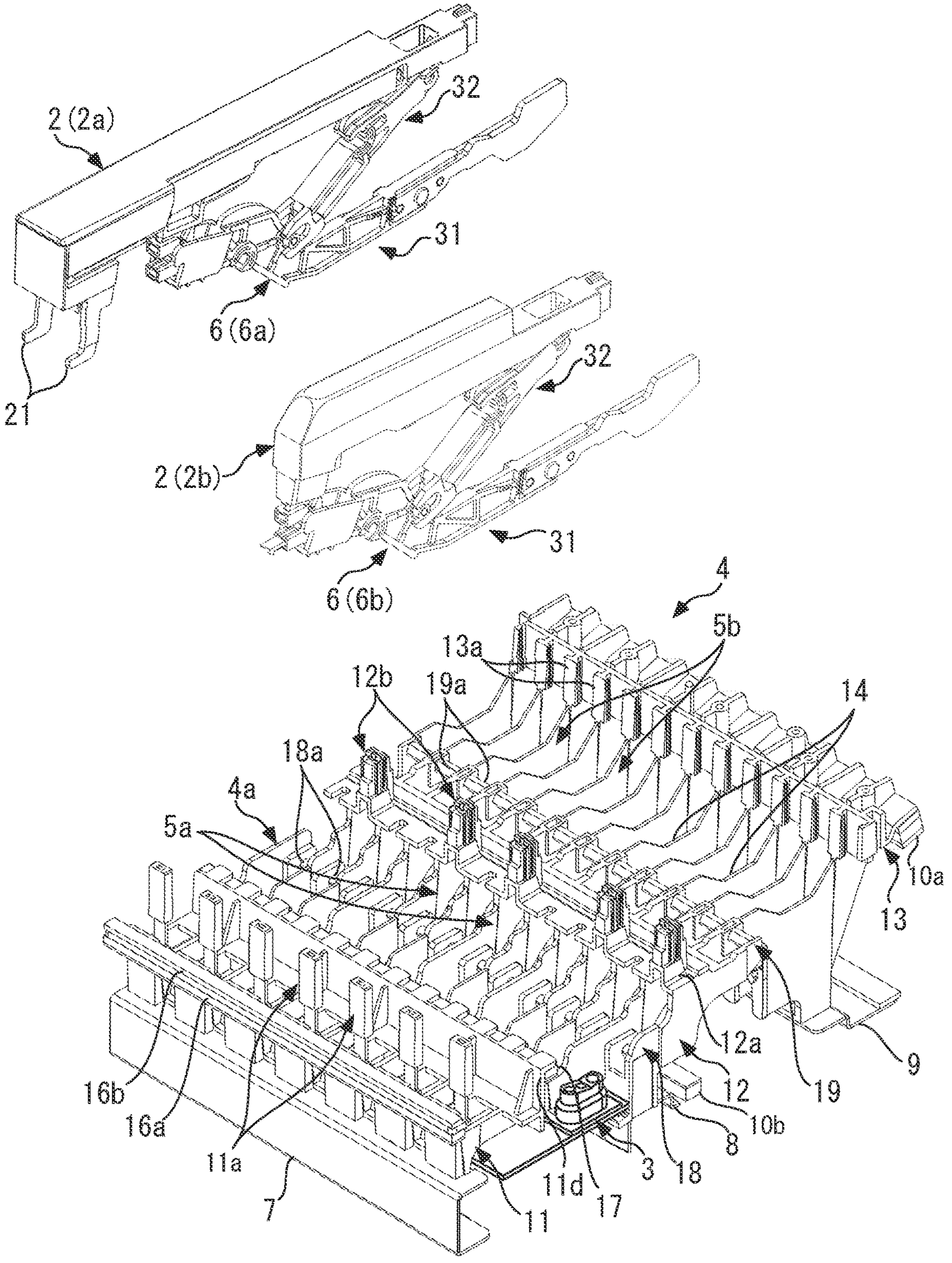
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged side by side in a left-right direction, a plurality of key support mechanisms 6 each pivotally mounted on the keyboard chassis 4, for supporting an associated one of the keys 2 from below, and key switches 3 each for detecting key depression information of an associated one of the keys 2.

Figure 3A:
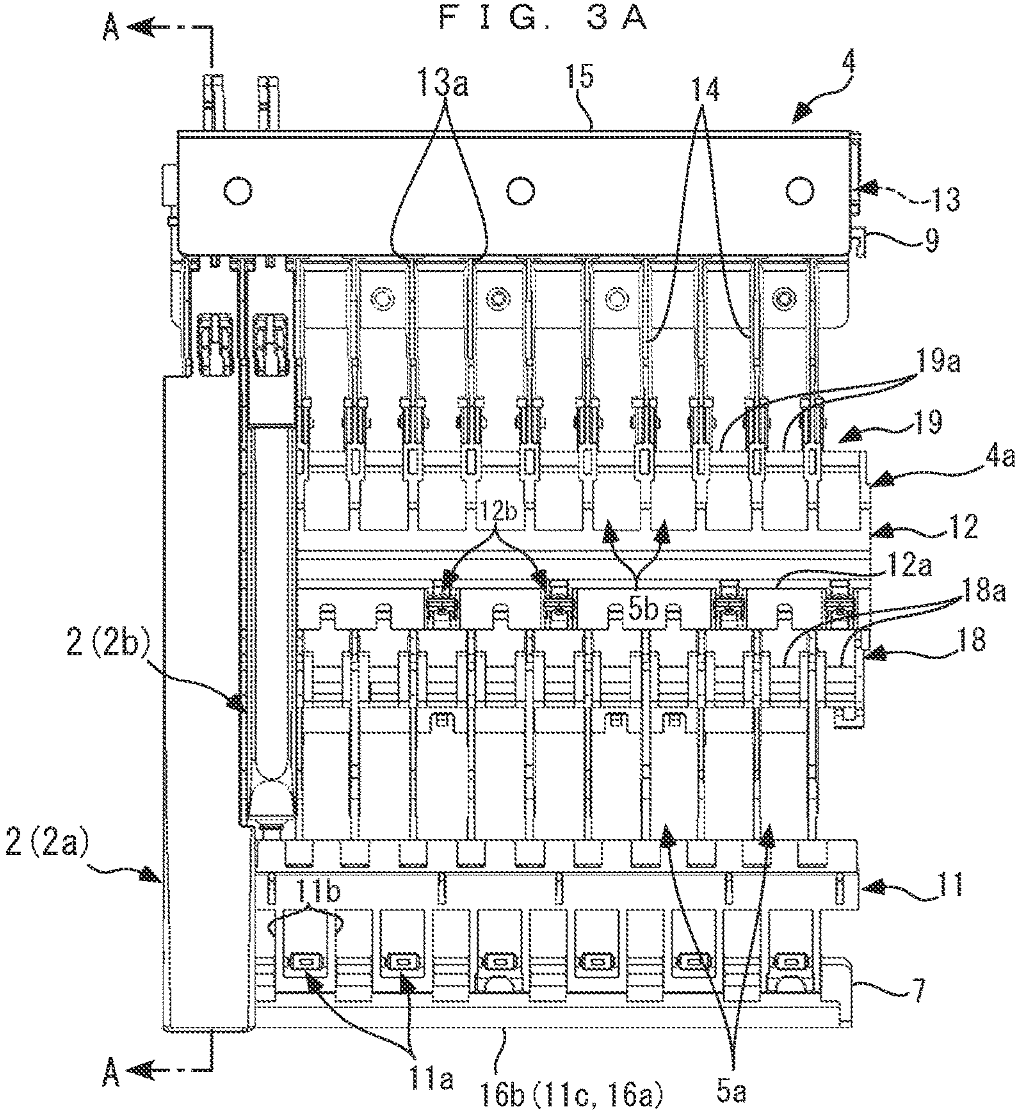
FIG. 3A is a plan view of the keyboard device from which the keys other than the white key and the black key at the left end of the keyboard device are omitted and FIG. 3B is a cross-sectional view taken along line A-A of FIG. 3A.
Figure 3B:
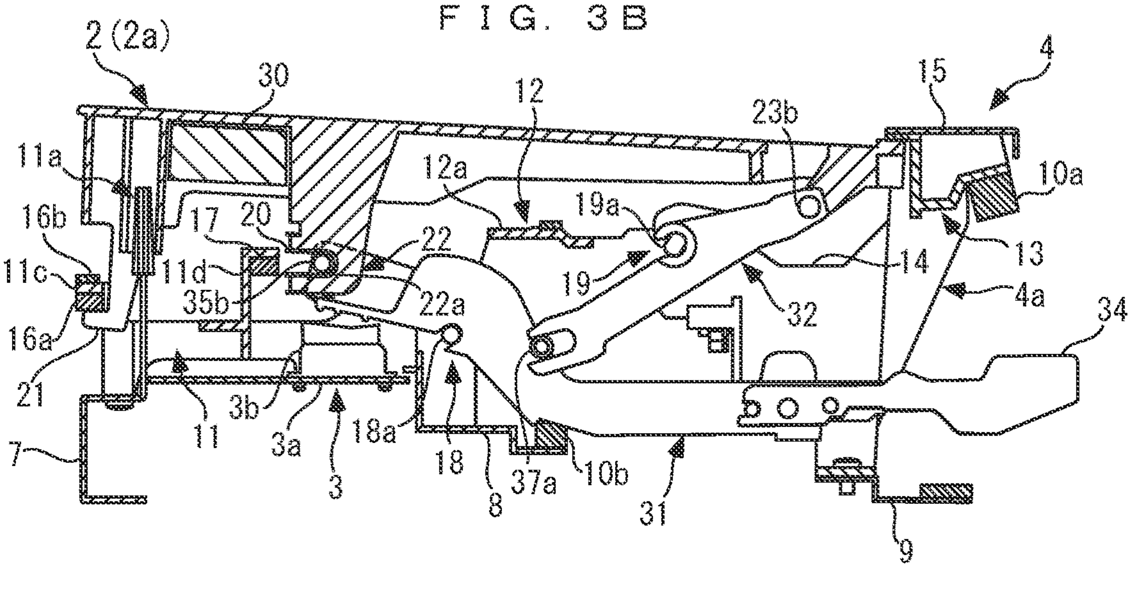

The keyboard chassis 4 includes a chassis body 4*a* formed as a resin molded article which is made e.g., by injection molding of a predetermined resin material (e.g., an ABS resin) into a predetermined shape. As shown in FIGS. 3A and 3B, the chassis body 4*a* has a front portion 11, an intermediate portion 12, and a rear portion 13, each extending in the left-right direction (in a left-right direction in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key 2*a* are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, provided below the chassis intermediate 12.

Further, the above-mentioned key switches 3 are mounted on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other in a state arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
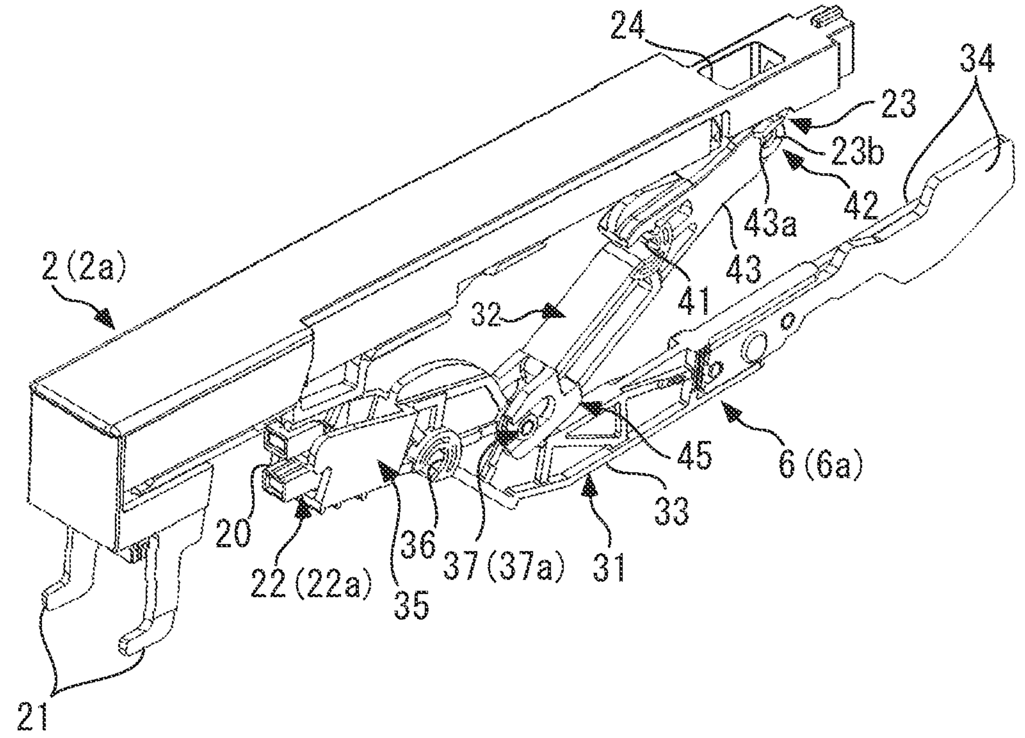
Figure 4B:
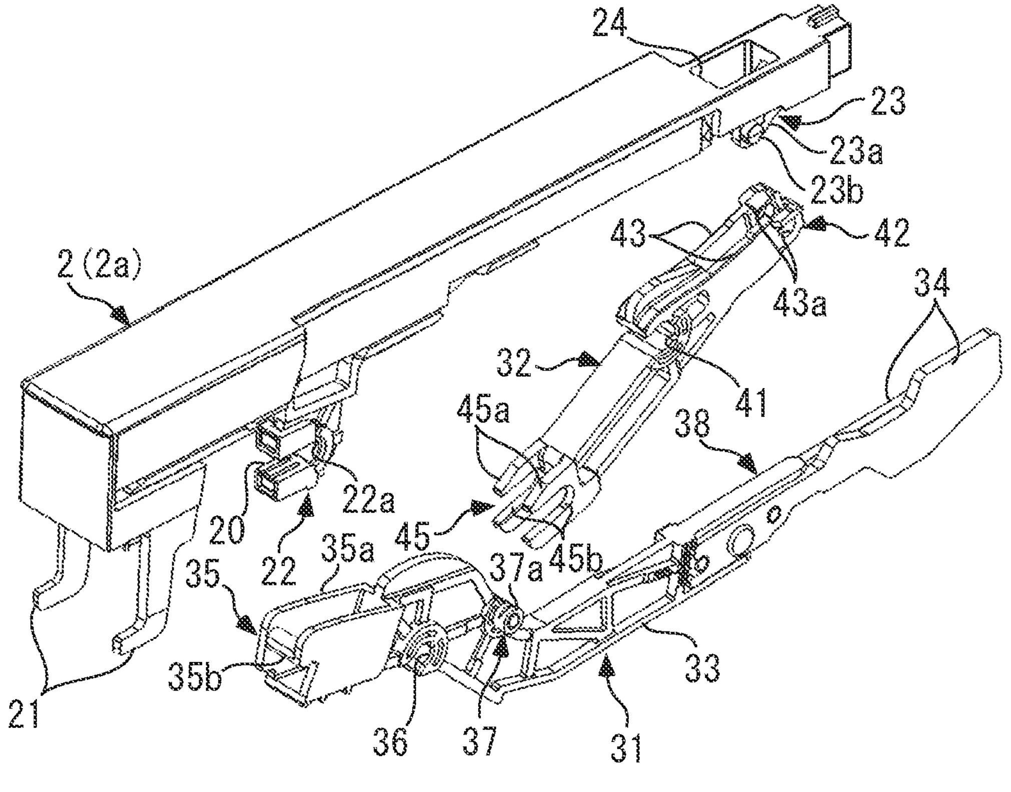

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed into a hollow shape which extends a predetermined length in the front-rear direction and opens downward e.g., by injection molding of a predetermined resin material (e.g., an AS resin). The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of the front portion of the white key 2*a*, rearward of the upper limit position regulation portions 21, there is provided a key front-side connecting portion 22 connected to the first arm 31 of the key support mechanism 6*a*. This key front-side connecting portion 22 includes a connecting recess 22*a* which has a U shape having a slot-like shape in side view and open forward. Further, the connecting recess 22*a* has a cushioning member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*. Note that in the front portion of the white key 2*a*, between the above-mentioned upper limit position regulation portions 21 and key front-side connecting portion 22, there is mounted a keyboard-associated weight 30 (see FIG. 3B) for adding a touch weight to the white key 2*a* during depression thereof.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engaging protrusions 23*b* and 23*b* which coaxially protrude from the left and right side surfaces of the connecting body portion 23*a*, respectively. Further, the rear portion of the white key 2*a* is formed with a tool insertion hole 24 which vertically extends through the rear portion, and is used to have a predetermined tool inserted therein from above for disconnecting the white key 2*a* from the second arm 32 of the key support mechanism 6*a* e.g., at the time of maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g., by injection molding of a predetermined resin material (e.g., polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37 formed at a predetermined location rearward of the bearing portion 36, for connection to the second arm 32. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g., by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 has a bifurcated shape formed by two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* is pivotally fitted on an associated one of the engaging protrusions 23*b* of the key rear-side connecting portion 23.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
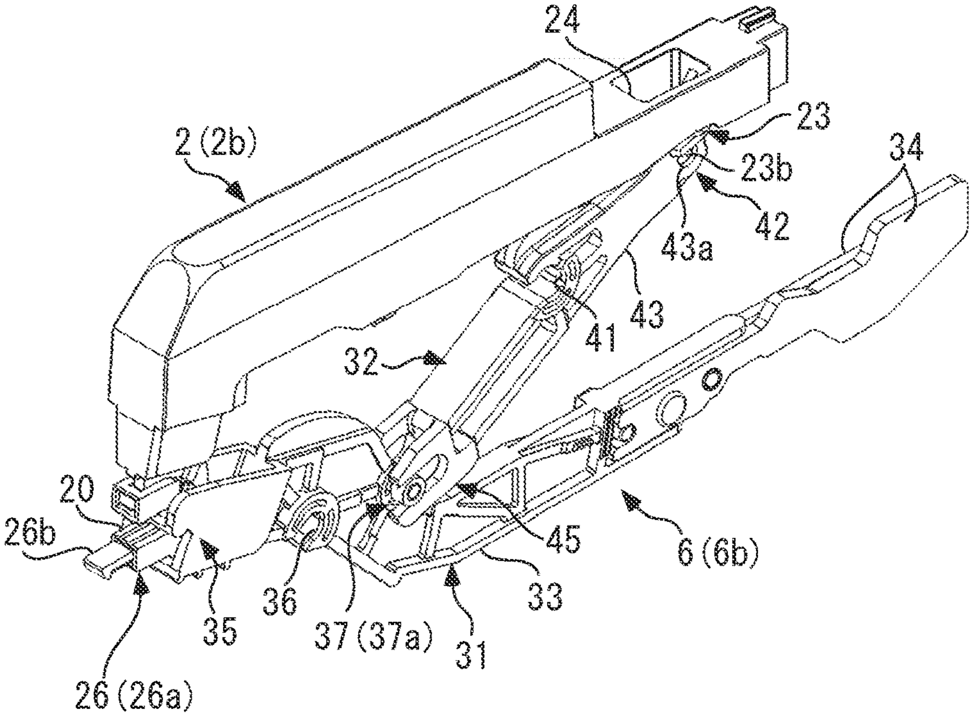
Figure 5B:
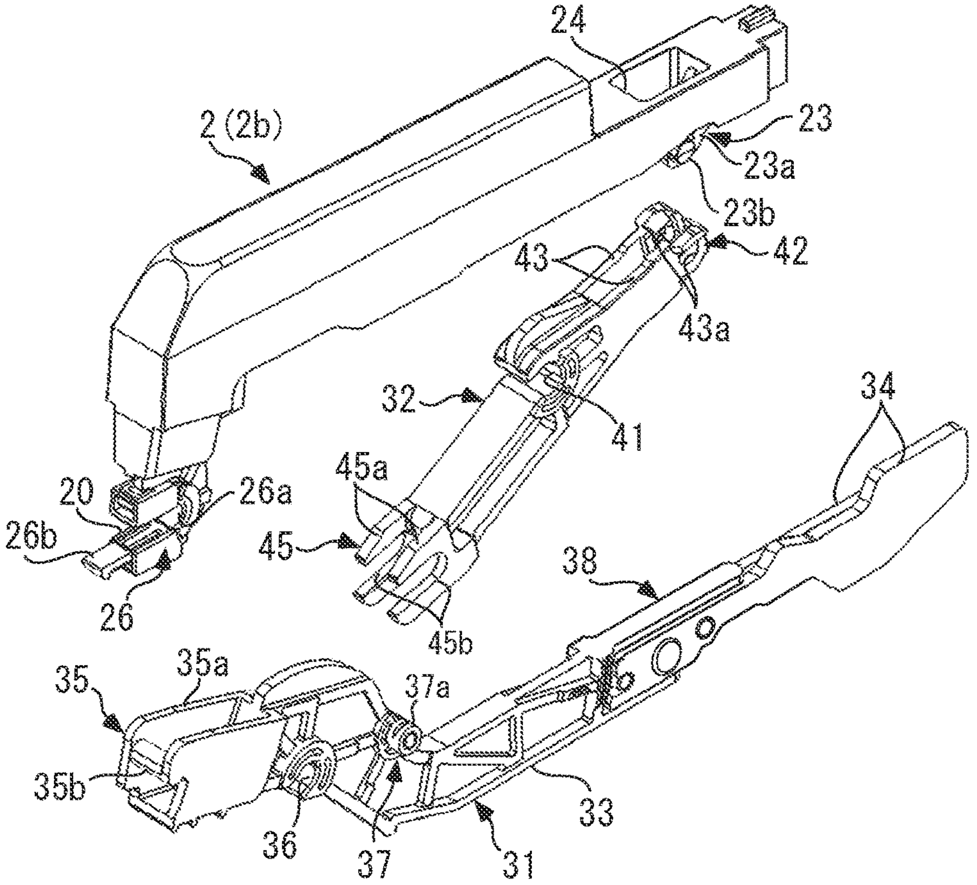

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g., by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that although the two left and right weights 34 and 34 of the black key-associated key support mechanism 6*b* are illustrated exactly the same as the weights 34 and 34 of the white key-associated key support mechanism 6*a*, the shapes and sizes of the weights 34 and 34 of the key support mechanisms 6*a* and 6*b* are changed as deemed appropriate according to touch weights and the like required for the keys 2.

Figure 6A:
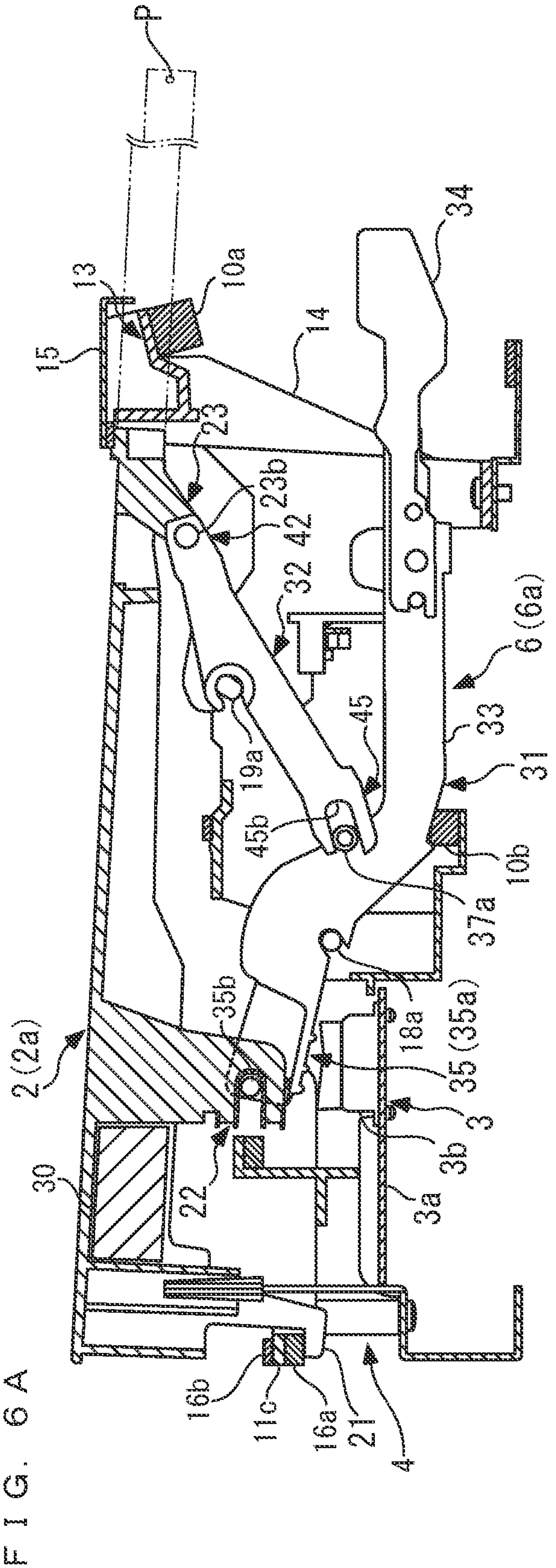
Figure 6B:
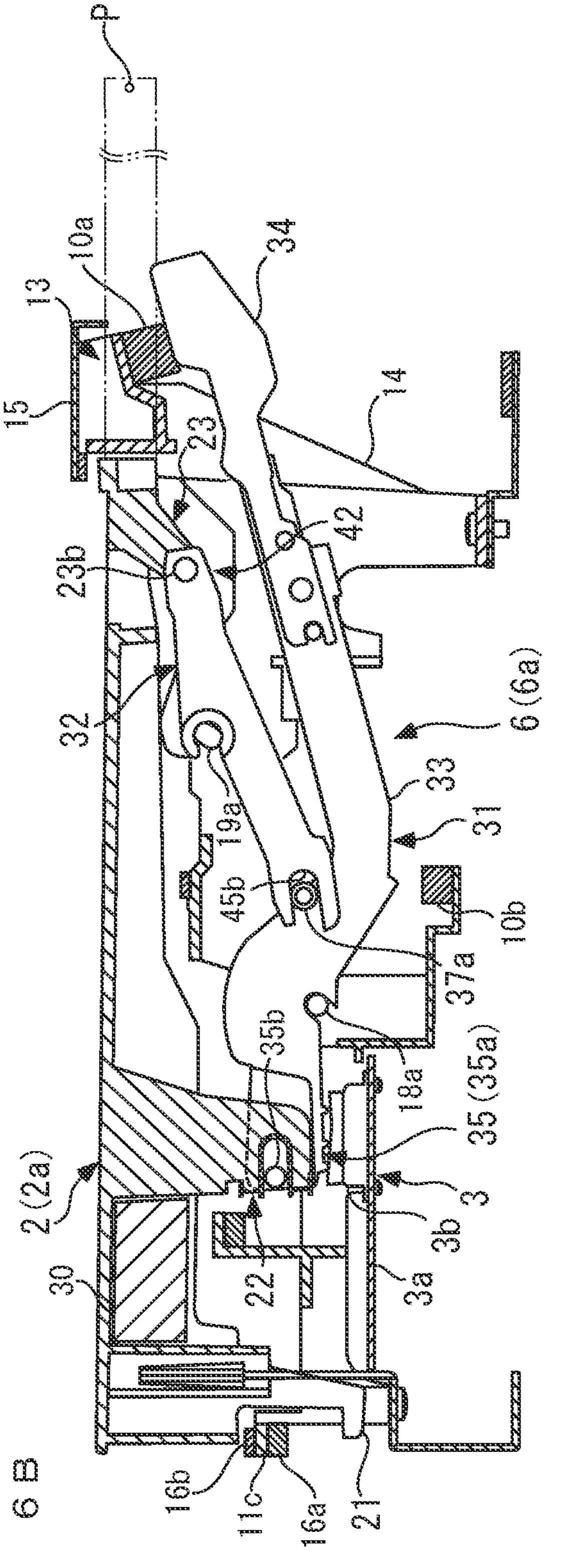
Figure 7A:
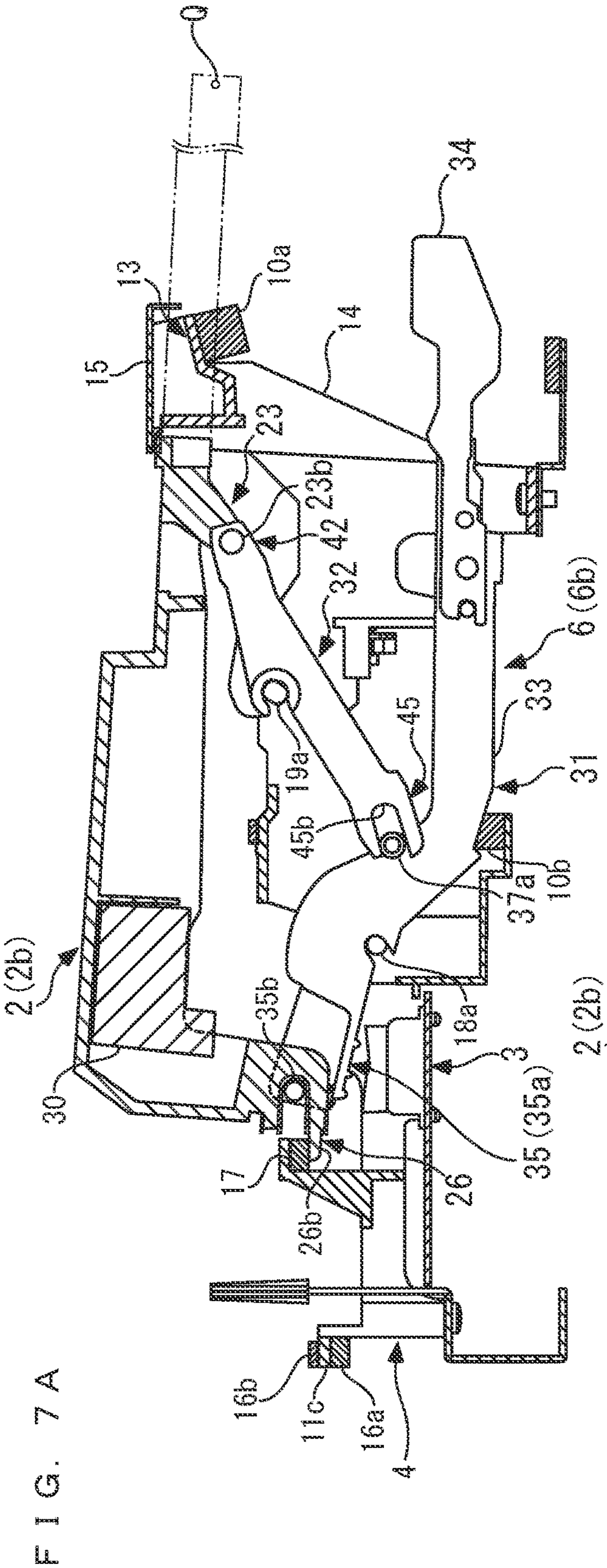
Figure 7B:
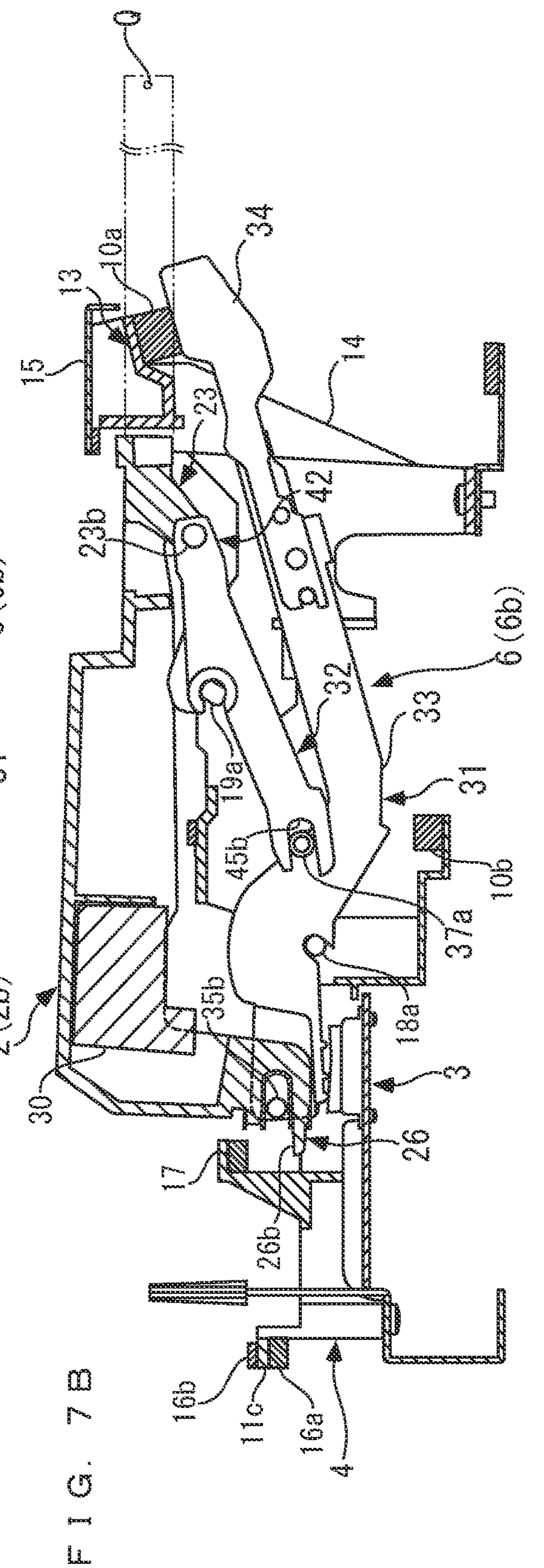

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described above, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as described above operates such that it pivotally moves about a virtual pivot P located rearward of the rear end thereof. The location of the virtual pivot P is set such that a distance from the front end of the white key 2*a* becomes e.g., approximately twice as long as the length of the white key 2*a* itself. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g., 10 mm) and the rear end of the white key 2*a* is located lower by a distance (e.g., 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes e.g., approximately twice as long as the length of the black key 2*b* itself. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIG. 8A to FIG. 10. The essential part of the present invention is a construction of the first arm 31 having a function as a hammer for adding a touch weight to the key 2, in which the first arm 31 has two weights 34 and 34 different in shape from each other, and one weight 34 is formed with a stopper contact portion 34*d* protruding more upward than the other weight 34.

Figure 8A:
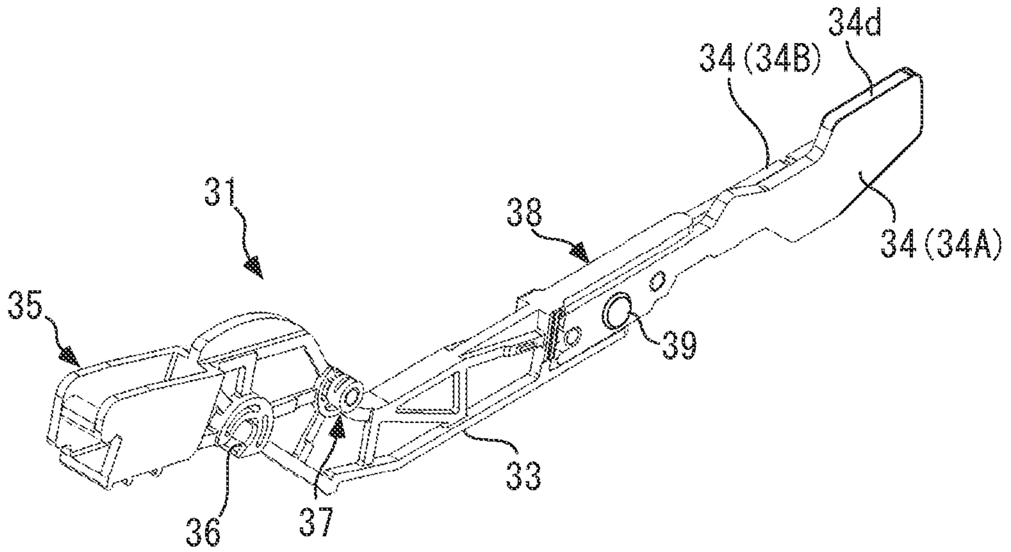
Figure 8B:
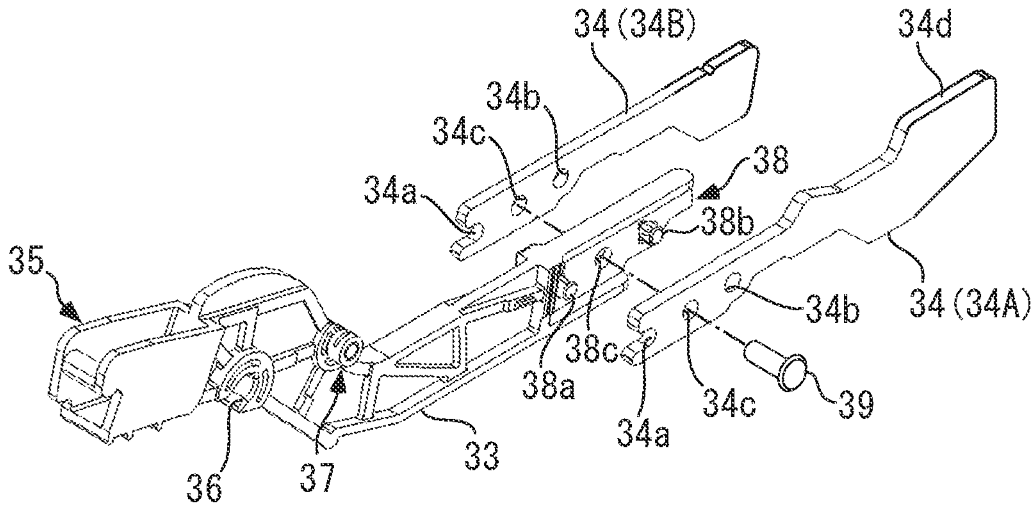

FIGS. 8A and 8B show the first arm 31. FIG. 8A is a perspective view of the appearance of the first arm 31 and FIG. 8B is an exploded perspective view of the first arm 31 in a state in which the arm body 33 and the two weights 34 and 34 are separated from each other. As described hereinabove, the first arm 31 is comprised of the arm body 33, and the two weights 34 and 34 which are mounted on the weight mounting portion 38 as the rear portion of the arm body 33, in the state sandwiching the weight mounting portion 38. On the weight mounting portion 38 of the arm body 33, at respective predetermined locations of each of opposite left and right side surfaces thereof, there are formed two front-side and rear-side engagement protrusions 38*a* and 38*b* protruding outward. Between the front-side and rear-side engagement protrusions 38*a* and 38*b*, there is formed a mounting hole 38*c* extending through the weight mounting portion 38 in the left-right direction.

The two weights 34 and 34 have front halves having the same shape. Specifically, each weight 34 is formed with an engagement recess 34*a*, an engagement hole 34*b*, and a mounting hole 34*c*, which are associated with the front-side engagement protrusion 38*a*, the rear-side engagement protrusion 38*b*, and the mounting hole 38*c* of the arm body 33, respectively. Further, the two weights 34 and 34 are fixed to the arm body 33 in the state sandwiching the weight mounting portion 38 of the arm body 33, by crimping a rivet 39 inserted through the mounting holes 34*c*, 34*c* and 38*c*.

Further, one of the two weights mounted on the first arm 31 (hereinafter referred to as "the common weight 34A") has a predetermined length and is common to the plurality of first arms 31. Further, the other weight (hereinafter referred to as "the adjustment weight 34B") is formed to have a length equal to or shorter than that of the common weight 34A.

Note that FIGS. 8A and 8B show the adjustment weight 34B shorter in length than the common weight 34A. Further, it is possible to use the same common weight 34A for all the first arms 31 of the keyboard device 1 or use the same common weight 34A only for first arms 31 in each of predetermined ranges (e.g., a low-pitched sound range, a middle-pitched sound range, and a high-pitched sound range).

Figure 9:
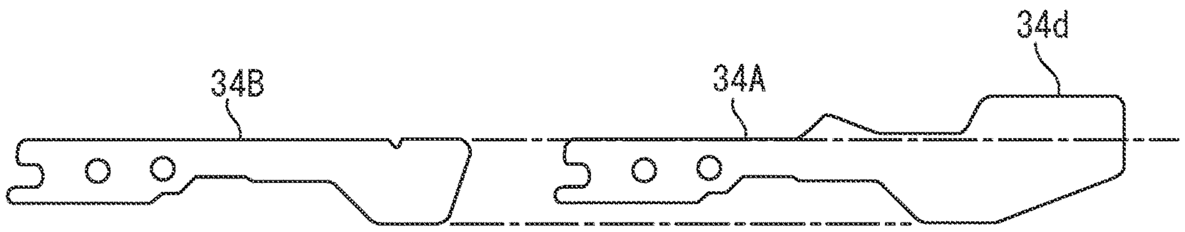
FIG. 9 is a side view of a common weight and an adjustment weight in a horizontally aligned state, in which (a) shows the adjustment weight and (b) shows the common weight.

FIG. 9 shows the adjustment weight 34B and the common weight 34A in a horizontally aligned state. As shown in FIG. 9, the common weight 34A has the stopper contact portion 34*d* provided on a rear portion thereof (right portion in FIG. 9). This stopper contact portion 34*d* protrudes more upward than an upper surface of the adjustment weight 34B and has an upper surface formed flat. As described heretofore, when the key 2 is depressed, in accordance with the pivotal movement of the first arm 31, the stopper contact portion 34*d*, which is a rear end of one of the weights 34 and 34, is brought into contact with the first arm upper limit stopper 10*a* (see FIGS. 6B and 7B). In this case, only the stopper contact portion 34*d* of the common weight 34A is brought into contact with the first arm upper limit stopper 10*a*.

Figure 10:
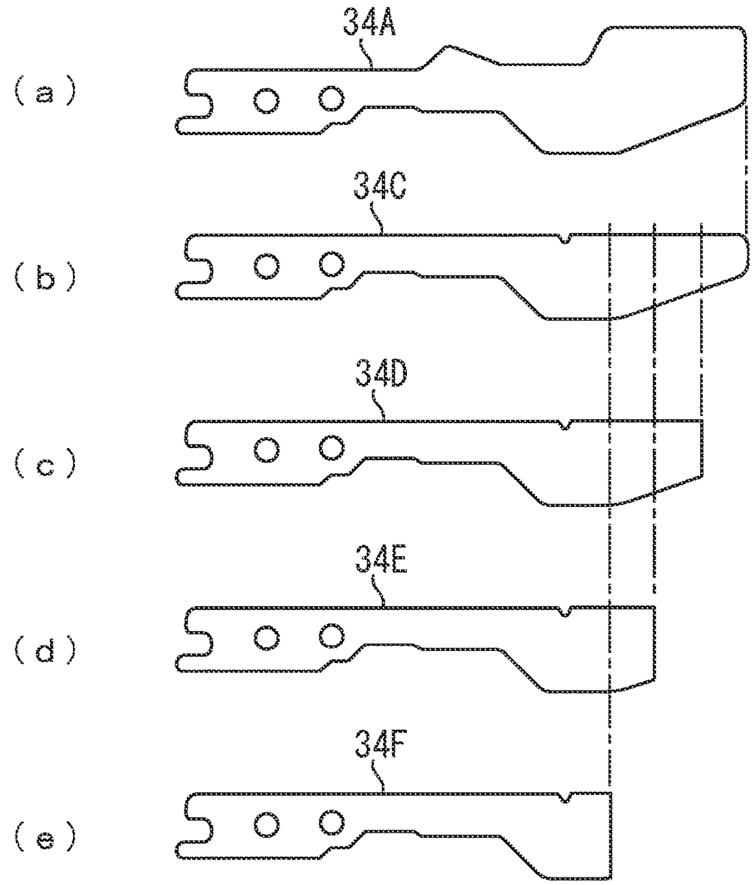
FIG. 10 is a side view of the common weight and a plurality of adjustment weights in a vertically aligned state, in which (a) shows the common weight and (b) to (e) show the adjustment weights different in length from each other.

FIG. 10 shows the common weight 34A and four adjustment weights 34C to 34F. The common weight 34A and the adjustment weight 34C shown (a) and (b) in FIG. 10, respectively, are set to the same length. On the other hand, the adjustment weights 34D, 34E and 34F shown in (c) to (e), respectively, are shorter in length than the adjustment weight 34C shown (b), and further the lengths of the adjustment weights 34D, 34E and 34F are different from each other. These adjustment weights 34D, 34E and 34F can be easily made as adjustment weights different in weight from each other by preparing the adjustment weight 34C shown in (b) in advance and cutting off respective appropriate rear portions thereof.

As described above in detail, according to the present embodiment, while the common weight 34A is formed common in shape and size to the plurality of first arms 31, the adjustment weight 34B has a length dimension in the front-rear direction set to be equal to or shorter than that of the common weight 34A. By attaching the above-described common weight 34A and adjustment weight 34B to the arm body 33, it is possible to secure not less than half of weight required for each first arm 31 using the common weight 34A and easily adjust the weight required for the first arm 31 using the adjustment weight 34B.

Further, the common weight 34A is provided with the stopper contact portion 34*d* protruding more upward than the adjustment weight 34B, and out of the first arm 31 which is pivotally moved in interlock with depression of the key 2, the stopper contact portion 34*d* of the common weight 34A is brought into contact with the first arm upper limit stopper 10*a*. With this, compared with e.g. a case where both of the common weight 34A and the adjustment weight 34B are brought into contact the first arm upper limit stopper 10*a*, it is possible to reduce an area brought into contact with the first arm upper limit stopper 10*a*, whereby it is possible to suppress generation of noise when the first arm 31 is brought into the first arm upper limit stopper 10*a*. Further, by adjusting the height of the stopper contact portion 34*d*, it is possible to change timing at which the first arm 31 is brought into contact with the first arm upper limit stopper 10*a*, whereby it is possible to adjust a key stroke of the key 2.

Further, since the weight of the adjustment weight 34B can be changed by changing the length dimension of the adjustment weight 34B in the front-rear direction, it is possible to easily adjust a touch weight required for the associated key 2 using the total weight of the common weight 34A and the adjustment weight 34B.

Note that the present invention is not limited to the above-described embodiment, but it can be practiced in various forms. Although in the above-described embodiment, the common weight 34A is provided with the stopper contact portion 34*d* protruding more upward than the adjustment weight 34B (hereinafter referred to as "the upper-side stopper contact portion 34*d*"), the present invention is not limited to this, but the common weight 34A may be provided with a lower-side stopper contact portion protruding more downward than the adjustment weight 34B, together with the upper-side stopper contact portion 34*d*. By providing a stopper similar to the above-mentioned first arm lower limit stopper 10*b* below the common weight 34A, the lower-side stopper contact portion contacts the stopper from above in the key-released state. With this, when the first arm 31 having been pivotally moved in accordance with depression of the key 2 returns to its original key-released state, only the above-described lower-side stopper contact portion is brought into contact with the stopper, and hence it is possible to suppress generation of noise at the time of the contact.

Further, although in the above-described embodiment, the description is given of a case where the length dimension of the adjustment weight 34B in the front-rear direction is set to be equal to or shorter than that of the common weight 34A, the length dimension of the adjustment weight 34B in the front-rear direction can also be set to be longer than that of the common weight 34A depending on the model of the keyboard device or the like.

Further, details of the constructions of the first arm 31, the common weight 34A, and the adjustment weights 34B to 34F shown in the embodiment are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A hammer device for a keyboard instrument, which includes a plurality of hammers each provided in association with an associated one of a plurality of keys, and in which each of the hammers is pivotally moved in interlock with depression of the associated key to thereby add a touch weight to the key, wherein each of the plurality of hammers comprises:

a hammer body extending in a front-rear direction, the hammer body having a front half thereof pivotally supported and a rear half thereof formed with a weight mounting portion;

a first weight extending in the front-rear direction, the first weight being formed common in shape and size to the plurality of hammers, and attached to one of left and right side surfaces of the weight mounting portion; and a second weight extending in the front-rear direction and attached to the other of the left and right side surfaces of the weight mounting portion, wherein the first weight includes a stopper contact portion protruding at least either more upward than an upper surface of the second weight or more downward than the second weight, for being brought into contact with a stopper in accordance with pivotal movement of the hammer caused by depression of the key associated therewith.

2. The hammer device according to claim 1, wherein the second weight has a length dimension in the front-rear direction set according to a touch weight required for the associated key.

* * * * *